(12) United States Patent
Kerth et al.

(10) Patent No.: US 7,979,048 B2
(45) Date of Patent: Jul. 12, 2011

(54) QUASI NON-VOLATILE MEMORY FOR USE IN A RECEIVER

(75) Inventors: Donald A. Kerth, Austin, TX (US); Brian D. Green, Austin, TX (US); Augusto M. Marques, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 754 days.

(21) Appl. No.: 11/227,796

(22) Filed: Sep. 15, 2005

(65) Prior Publication Data

US 2007/0060093 A1 Mar. 15, 2007

(51) Int. Cl.
 *H04B 1/16* (2006.01)
(52) U.S. Cl. ............ 455/343.1; 455/343.2; 455/343.5; 455/343.6
(58) Field of Classification Search .......... 455/192.2, 455/343.1–343.6, 117, 127.1, 230, 298, 572, 455/574, 327
See application file for complete search history.

(56) References Cited

U.S. PATENT DOCUMENTS

| | | | | |
|---|---|---|---|---|
| 4,589,097 A * | 5/1986 | Ebihara | ............... | 365/189.03 |
| 4,843,588 A * | 6/1989 | Flynn | ............... | 455/186.1 |
| 5,199,032 A | 3/1993 | Sparks et al. | | |
| 5,333,176 A * | 7/1994 | Burke et al. | ............... | 455/557 |
| 5,740,517 A * | 4/1998 | Aoshima | ............... | 340/7.34 |
| 5,826,180 A | 10/1998 | Golan | | |
| 5,898,930 A * | 4/1999 | Terashima et al. | ............... | 455/572 |
| 6,078,799 A * | 6/2000 | McDowell et al. | ............... | 455/302 |
| 6,137,999 A | 10/2000 | Lovelace et al. | | |
| 6,144,845 A | 11/2000 | Durec | | |
| 6,330,290 B1 | 12/2001 | Glas | | |
| 6,785,529 B2 | 8/2004 | Ciccarelli et al. | | |
| 6,892,060 B2 | 5/2005 | Zheng | | |
| 7,421,257 B1 * | 9/2008 | Elliott | ............... | 455/127.5 |
| 2003/0072393 A1 | 4/2003 | Gu | | |
| 2005/0009483 A1 | 1/2005 | Eilts et al. | | |
| 2005/0070236 A1 | 3/2005 | Paulus et al. | | |
| 2006/0019624 A1 | 1/2006 | Suominen | | |
| 2006/0030277 A1 * | 2/2006 | Cyr et al. | ............... | 455/77 |
| 2006/0172782 A1 * | 8/2006 | Planning et al. | ............... | 455/572 |
| 2006/0189288 A1 * | 8/2006 | Jin et al. | ............... | 455/232.1 |
| 2006/0252399 A1 * | 11/2006 | Paulus | ............... | 455/302 |
| 2009/0077408 A1 * | 3/2009 | Wong | ............... | 713/340 |

OTHER PUBLICATIONS

"A Novel Adaptive Mismatch Cancellation System for Quadrature IF Radio Receivers," Yu et al., IEEE Transactions on Circuits and Systems-II, vol. 46, No. 6, Jun. 1999.
"Circuit Design for Wireless Communications: Improved Techniques for Image Rejection in Wideband Quadrature Receivers," Pun et al., The Chinese University of Hong Kong, Kluwer International Series in Engineering and Computer Science, 728, Apr. 2003.
"Analysis of Improved Hartley Image-Reject Receiver by Bandpass Delta Signal Modulator," Chang et al., Dept. of Electrical Engineering, Ohio State University, Kluwer Academic Publishers, Boston, 1999.

(Continued)

*Primary Examiner* — Dominic E Rego
(74) *Attorney, Agent, or Firm* — Polansky & Associates, P.L.L.C.; Paul J. Polansky (57) ABSTRACT

Image rejection factors are calibrated for a receiver circuit (106) during an initialization period. The image rejection factors are stored in a quasi non-volatile memory (124) associated with the receiver circuit (106). The quasi non-volatile memory (124) is powered from a first source ($V_{DD}A$) during a first receiver mode and from a second source ($V_{IO}$) during a second receiver mode.

15 Claims, 4 Drawing Sheets

OTHER PUBLICATIONS

"Adaptive Calibration Methods for an Image-Reject Mixer," Sever, Isaac; Research Project Submitted to the Dept. of Electrical Engineering and Computer Sciences, University of California at Berkeley.

"Aero I/Aero I+ GSM/GPRS Transceiver," Product Description; Silicon Laboratories, Austin, TX; www.silabs.com, Mar. 2003.

"Self-Calibrated Image-Reject Mixer," John Wetherell, Qualcomm; www.eecs.berkel.edu/~wetherel, Aug. 2003.

"On-Chip Image Reject Techniques for Wireless Receivers," Yan, University of Toronto Dept. of Electrical and Computer Engineering, Nov. 2001.

\* cited by examiner

QUASI NON-VOLATILE MEMORY FOR USE IN A RECEIVER

CROSS-REFERENCE TO RELATED APPLICATIONS

The present application is related to U.S. patent application Ser. No. 10/673,915, now U.S. Pat. App. Publication No. 2005/0070236A1 entitled "APPARATUS AND METHOD FOR DERIVING A DIGITAL IMAGE CORRECTION FACTOR IN A RECEIVER" filed on Sep. 29, 2003 by Tod Paulus, U.S. patent application Ser. No. 10/675,601, now U.S. Pat. App. Publication No. 2005/0070239A1 entitled "APPARATUS AND METHOD FOR DIGITAL IMAGE CORRECTION IN A RECEIVER" filed on Sep. 29, 2003 by Tod Paulus, both of which are incorporated herein by reference in their entirety.

TECHNICAL FIELD

The present application generally relates to radio frequency receivers, and more particularly to storage of calibration information within a receiver.

BACKGROUND

Increasingly, modern communications systems transmit and receive information by modulating a radio frequency (RF) carrier signal with a data signal and by demodulating the RF carrier signal to recover the data signal, respectively. In order to demodulate the RF carrier signal, a receiver is tuned to the carrier signal.

One technique for modulating and demodulating such signals involves heterodyning, which involves mixing a received signal with a second signal to produce an intermediate signal at an intermediate frequency (IF). Typically, heterodyning systems multiply one signal, such as an RF signal, with a second signal close in frequency to the first, often referred to as a local oscillator (LO) signal. This operation produces signals at frequencies equal to the sum and difference of the RF frequency and the LO frequency. The sum frequency is usually substantially higher than the RF or LO frequency and may be readily filtered using a simple low-pass filter. The difference frequency is the IF frequency, which is usually close to DC and is therefore readily manipulated by simple filters.

Unfortunately, a desired RF frequency may lie either above or below the LO frequency. Due to the symmetric properties of the mixing operation, heterodyning systems may select any RF signal differing from the LO frequency by the IF frequency, whether the selected signal lies above or below the given LO frequency. For example, if a desired signal is at 1.01 GHz and the LO signal is at 1.00 GHz, mixing the two signals results in an IF frequency of 0.01 GHz. If two RF signals are present (one at 0.99 GHz and one at 1.01 GHz), they may both be converted to the 0.01 GHz IF frequency, thereby resulting in interference with the information content of the desired RF signal. In general, receivers that use heterodyning techniques are susceptible to "imaging." The image frequency is equal to the sum or the difference of the LO frequency and the IF frequency ($f_{image}=f_{LO} \pm f_{IF}$).

One technique for addressing the phenomenon of imaging is described in U.S. Patent Publication Nos. 2005/0070239A1 and 2005/0070236A1, both of which were invented by Tod Paulus on Sep. 29, 2003, and are incorporated herein by reference.

In mobile communication devices, voltage supplies are tightly controlled in order to reduce power consumption and lengthen battery life. Moreover, during inactive periods, power to selected circuits may be cycled between on and off states in order to reduce power consumption. For example, power may be provided to digital signal processing (DSP) circuitry on the receiver circuit only when a signal is being received, such as during Time Division Multiple Access (TDMA) bursts. In this instance, between bursts and during transmit processes, the power supply to the DSP circuitry may be shut down ("collapsed"). By turning off the power to the DSP circuitry, overall power consumption is reduced, as compared to the power consumption of a DSP circuit that received a constant power supply. However, if the DSP circuit is used to perform the calibration operations and the power supply to the DSP circuit is turned off to preserve power, the error correction factor from the calibration operation may be lost.

BRIEF SUMMARY

In one form, image rejection factors are calibrated for a receiver circuit during an initialization period. The image rejection factors are stored in a quasi non-volatile memory associated with the receiver circuit. The quasi non-volatile memory is powered from a first source during a first receiver mode and from a second source during a second receiver mode.

In another form, a receiver circuit has a first supply voltage, a second supply voltage, and a quasi non-volatile memory coupled to the first and second supply voltages. The quasi non-volatile memory is adapted to store calibration results for the receiver circuit and to derive power from a selected one of the first supply voltage and the second supply voltage responsive to a change of state of at least a portion of the receiver circuit.

In yet another form, a receiver includes a memory, processing circuitry coupled to the memory, and a memory protection unit coupled to the memory. The processing circuitry has an input for receiving a radio frequency (RF) signal, and an output for providing an output signal at another frequency. The processing circuitry includes one or more independently powered components adapted to write data to the memory. The memory protection unit is adapted to monitor a power supply voltage level corresponding to each of the one or more independently powered components and, if the power supply voltage level changes, to prevent write operations by a corresponding one of the one or more independently powered components at least while the power supply voltage level is changing.

BRIEF DESCRIPTION OF THE DRAWINGS

It is noted that the appended drawings illustrate only exemplary embodiments of the invention and are, therefore, not to be considered limiting of its scope, for the invention may admit to other equally effective embodiments.

The use of the same reference symbols in different drawings indicates similar or identical items.

DETAILED DESCRIPTION

A quasi non-volatile memory for use in a receiver as described herein derives power from a first power supply voltage during a first mode of operation and from a second power supply voltage during a second mode of operation. Thus, the quasi non-volatile memory is able to store and retain receiver calibration information, such as a complex error correction factor, even when power to other parts of the receiver is removed ("collapsed"). In one particular embodiment, the first power supply voltage has a higher electrical potential than the second power supply voltage, and the first power supply voltage allows the memory to operate with suitable performance while the second power supply voltage is only large enough to allow the memory to retain its contents. In another embodiment, a memory protection unit prevents access circuitry from performing write operations to the memory when the power supply voltage for that access circuitry becomes unavailable, thereby preventing spurious write operations that might corrupt data stored in the memory during power supply transitions.

Figure 1:
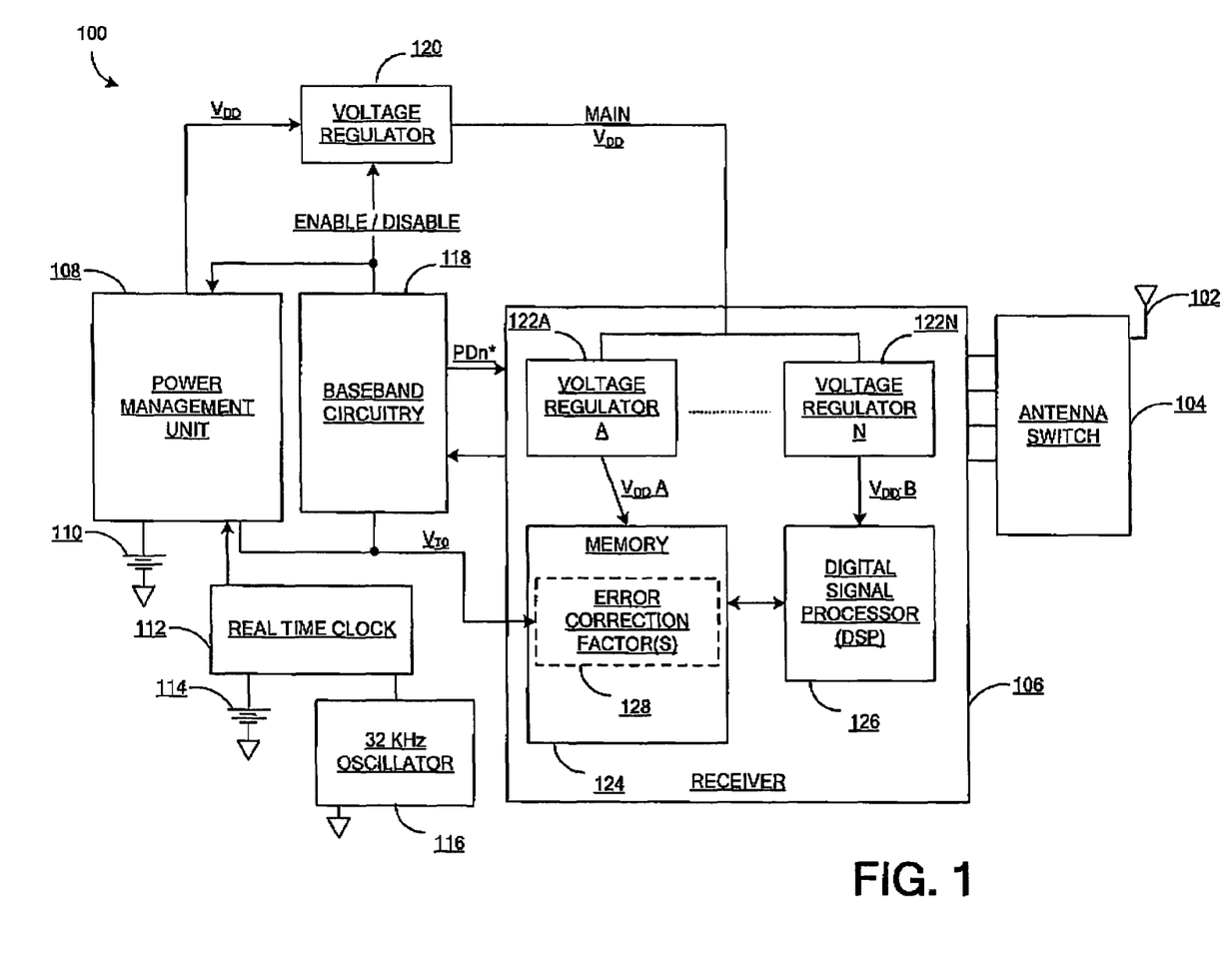
FIG. 1 is a simplified block diagram illustrating a communication system according to the present invention.

Now turning to the drawings, FIG. 1 is a simplified block diagram of an RF communication system 100 according to the present invention. In the example illustrated in FIG. 1, RF communication system 100 is a multi-standard cellular telephone handset. A quasi non-volatile memory as described herein may also be used in other types of receivers in which the power requirements are tightly controlled and in which the normal power supply to the memory may be intermittently unavailable.

RF communication system 100 includes generally an antenna 102, an antenna switch 104, a receiver 106, a power management unit 108, a power source 110, a real-time clock 112, a power source 114, an oscillator 116, baseband circuitry 118, and a voltage regulator 120. Antenna 102 is adapted to receive a radio frequency (RF) signal. As used herein, "radio frequency signal" means an electrical signal conveying useful information and having a frequency from about 3 kilohertz (kHz) to thousands of gigahertz (GHz), regardless of the medium through which such signal is conveyed. Thus an RF signal may be transmitted through air, free space, coaxial cable, fiber optic cable, etc. In the multi-standard cellular telephone example shown in FIG. 1, the RF signal may occupy signal bands centered at 850 megahertz (MHz), 950 MHz, 1800 MHz, or 1900 MHz. Antenna switch 104 has an input connected to antenna 102, and an output for providing four RF signals each in a selected one of these four corresponding signal bands.

Receiver 106 generally has four input terminals connected to the four output terminals of antenna switch 104, and an output terminal for providing a baseband output signal. Receiver 106 also has a first power supply voltage terminal for receiving a power supply voltage labeled "MAIN $V_{DD}$", a second power supply voltage terminal for receiving a power supply voltage labeled "$V_{IO}$", and a control input terminal for receiving an active-low power down control signal labeled "PDn*". Baseband circuitry 118 has a power supply voltage input terminal for receiving $V_{IO}$, a signal input terminal for receiving the baseband output signal from receiver circuitry 106, an output terminal for providing signal PDn*, and another output terminal for providing a control signal labeled "ENABLE/DISABLE".

Additional components of system 100 are related to the power supply. FIG. 1 shows those power supply connections that are important to understanding the present invention but omits other power supply connections. Power source 110 has a positive terminal for providing a positive voltage, and a negative terminal connected to ground, and is formed by a rechargeable battery. Power management unit 108 has a power supply voltage input terminal connected to the positive terminal of power source 110, a clock input terminal, a control input terminal for receiving the ENABLE/DISABLE signal, a first power supply output terminal for providing a power supply voltage labeled "$V_{DD}$", and a second power supply output terminal for providing $V_{IO}$. Power supply 114 has a positive terminal for providing a positive voltage, and a negative terminal connected to ground, and is formed by a long-life, non-rechargeable battery. Oscillator 116 has an output terminal for providing a periodic clock signal at 32 kilohertz (kHz). Real-time clock 112 has a power supply voltage terminal connected to the positive terminal of power source 114, a clock input terminal connected to the output terminal of oscillator 116, and an output terminal connected to the clock input terminal of power management unit 108 for providing a periodic wakeup signal thereto. Voltage regulator 120 has an input terminal for receiving $V_{DD}$, and an output terminal for providing MAIN $V_{DD}$.

In operation, receiver 106 is part of an integrated circuit transceiver that converts an RF signal received from a selected output of an antenna switch 104 to baseband for further processing in baseband circuitry 118. In general portable communications systems, such as wireless phones, hand-held computing systems, and the like typically have tightly controlled power requirements and may intermittently reduce or shut down power to various unused components in order to reduce power consumption and preserve battery life between recharges.

Receiver 106 includes a number of circuit components, some of which are useful in understanding the present invention and thus are illustrated in FIG. 1. Receiver 106 includes one or more voltage regulators 122, such as a representative voltage regulator A 122A and a representative voltage regulator N 122N, providing corresponding, independent power supply voltages labeled "$V_{DD}$A" and "$V_{DD}$N." As shown in FIG. 1, receiver 106 also includes a quasi non-volatile memory 124 and a digital signal processor (DSP) 126. Memory 124 has a first power supply input terminal connected to voltage regulator 122A for receiving its corresponding power supply voltage $V_{DD}$A, a second power supply input terminal connected to power management unit 108 for receiving $V_{IO}$, and a bidirectional connection for receiving address signals and conducting data signals, and includes an area 128 for storing calibration results in the form of one or more error correction factors. DSP 126 is coupled to voltage regulator 122N and receives corresponding power supply voltage $V_{DDN}$, and has a bidirectional connection to memory 124.

The power supply voltages within receiver 106 are capable of operating at different electrical potentials from one another. For example analog circuitry in receiver 106 generally requires a relatively high power supply voltage for correct operation due to headroom requirements of amplifiers and other analog circuits. However digital circuitry such as DSP 126 only requires a voltage sufficient to operate digital logic circuits and may be lower than the analog voltage.

Additionally, each one of voltage regulators 122A through 122N can be shut down independently from each other, thereby turning off ("collapsing") the power supply voltage to corresponding circuits while leaving other circuits operational. This feature allows low power operation during long periods of inactivity that may be encountered between transmission bursts.

Power management unit 108 also provides $V_{IO}$ separately to memory 124. Receiver 106 uses memory 124 to store one or more error correction factors 128 (shown in phantom) that adjust filters for mismatch in in-phase (I) and quadrature (Q) signal paths and that are determined by calibration performed in receiver 106. If power to other parts of receiver 106 were to be shut down when communications system 100 is not receiving a signal, error correction factors stored in the memory 124 would not be lost. Thus error correction factors that resulted from long calibration routines are preserved while many unneeded components of receiver 106 such as DSP 126 are shut down. Moreover as will be explained more fully below memory 124 is powered from $V_{DD}$A during normal operation mode, allowing it to have a sufficiently short access time to interface with DSP 126. During a power down mode, memory 124 is powered from the lower $V_{IO}$ voltage, which allows it to retain its contents during periods of inactivity but otherwise maintain very low power consumption.

In particular memory 124 includes a power supply switch that provides either $V_{DD}$A or $V_{IO}$ as its internal power supply voltage, whichever voltage is greater. In this way, a volatile memory (such as a static random access memory) is converted into memory that appears to the system to be nonvolatile, and hence memory 124 is referred to as a quasi non-volatile memory.

Figure 2:
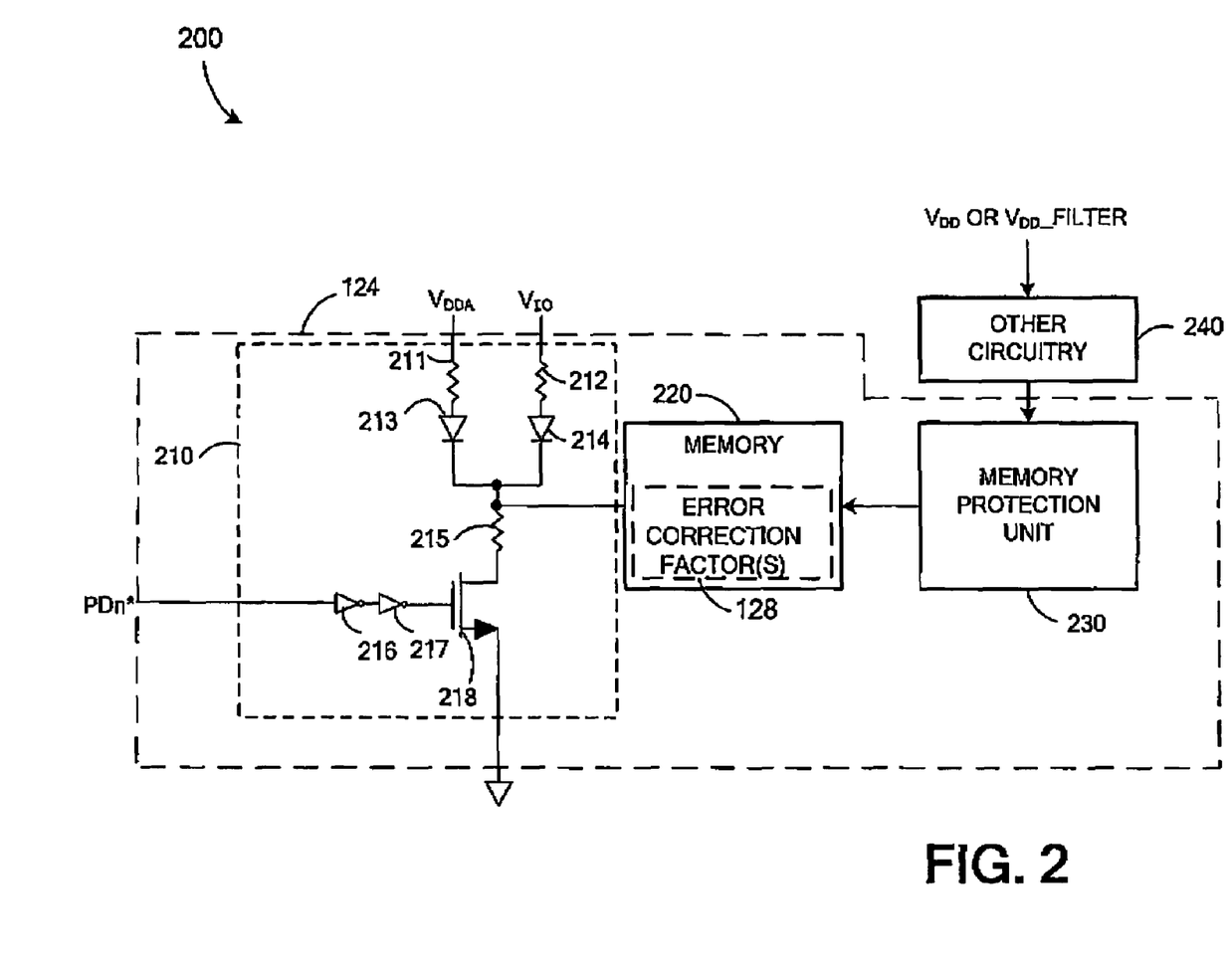
FIG. 2 is a partial block diagram and partial circuit diagram of a portion of the receiver of FIG. 1 including a switching power supply.

This feature is better understood with reference to FIG. 2, which is a partial block diagram, partial logic diagram, and partial circuit diagram of a portion 200 of receiver 106 of FIG. 1 useful in understanding the present invention. Portion 200 includes quasi non-volatile memory 124 and other circuitry illustrated generally as 240. Quasi non-volatile memory 124 includes generally a power supply switch 210, a memory array 220, and a memory protection unit 230. Power supply switch 210 has a first positive power supply voltage terminal for receiving $V_{DD}$A, a second positive power supply voltage terminal for receiving $V_{IO}$, a negative power supply voltage terminal connected to ground, a control input terminal for receiving signal PDn*, and an output terminal. More particularly power supply switch 210 includes resistors 211 and 212, diodes 213 and 214, a resistor 215, inverters 216 and 217, and an N-channel metal-oxide-semiconductor (MOS) transistor 218. Resistor 211 has a first terminal for receiving $V_{DD}$A, and a second terminal. Resistor 212 has a first terminal for receiving $V_{IO}$, and a second terminal. Diode 213 has a positive terminal connected to the second terminal of resistor 211, and a negative terminal connected to an output node. Diode 214 has a positive terminal connected to the second terminal of resistor 212, and a negative terminal connected to the output node. Resistor 215 has a first terminal connected to the output node, and a second terminal. Inverter 216 has an input terminal for receiving signal PDn*, and an output terminal. Inverter 217 has an input terminal connected to the output terminal of inverter 217, and an output terminal. Transistor 218 has a drain connected to the second terminal of resistor 215, a gate connected to the output terminal of inverter 217, and a source connected to ground.

Memory array 220 has a positive power supply voltage terminal connected to the output node of power supply switch 210, and a write port, and includes area 128 for storing calibration results. Memory protection unit 230 has an input terminal, and an output terminal connected to the write port of memory array 220. Other circuitry 240 has a power supply voltage terminal for receiving a voltage labeled "$V_{DD}$ or $V_{DD}$_FILTER," and an output terminal connected to the input terminal of memory protection unit 230.

In operation, switching power supply 201 switches between two sources, $V_{DDA}$ and $V_{IO}$, which are selectively connected to the output node through resistors 211 and 212 and diodes 213 and 214, respectively. Current flows through the resistor and diode corresponding to whichever power supply voltage supply is greater. Thus, if $V_{DD}$A is turned off, $V_{IO}$ delivers power to memory array 220.

Signal PDn* is provided by baseband circuitry 118 of FIG. 1. When signal PDn* is inactive at a logic high, then transistor 218 is conductive and current flows through resistor 215. Resistor 215 is used to keep the active diode forward biased and thus preserve the voltage at the output node even when memory array 220 is not active. When signal PDn* is active at a logic low, which occurs when $V_{DD}$A has been collapsed, transistor 218 is nonconductive to prevent any leakage current from flowing through power supply switch 210. In either case, power is supplied by one of the voltage sources ($V_{DD}$A or $V_{IO}$) to memory array 220.

Portion 200 also includes memory protection unit 230 to prevent other circuitry 240 from writing to memory array 220 when its power supply or supplies have been collapsed. Other circuitry 240 is shown generically to encompass any circuit capable of writing to memory 124. For example, if power to DSP 126 is collapsed, then memory protection unit 230 prevents it from performing a spurious write cycle to memory array 220. Memory protection unit 230 also inhibits write operations during power supply transitions even if the power supply voltage is sufficiently large. For example, when DSP 126 transitions from an off to an on state, memory protection unit 230 inhibits all write operations received from DSP 126 until the power supply to DSP 126 stabilizes at the on state. The operation of memory protection unit 230 will be explained more fully with reference to FIG. 4 below.

Figure 3:
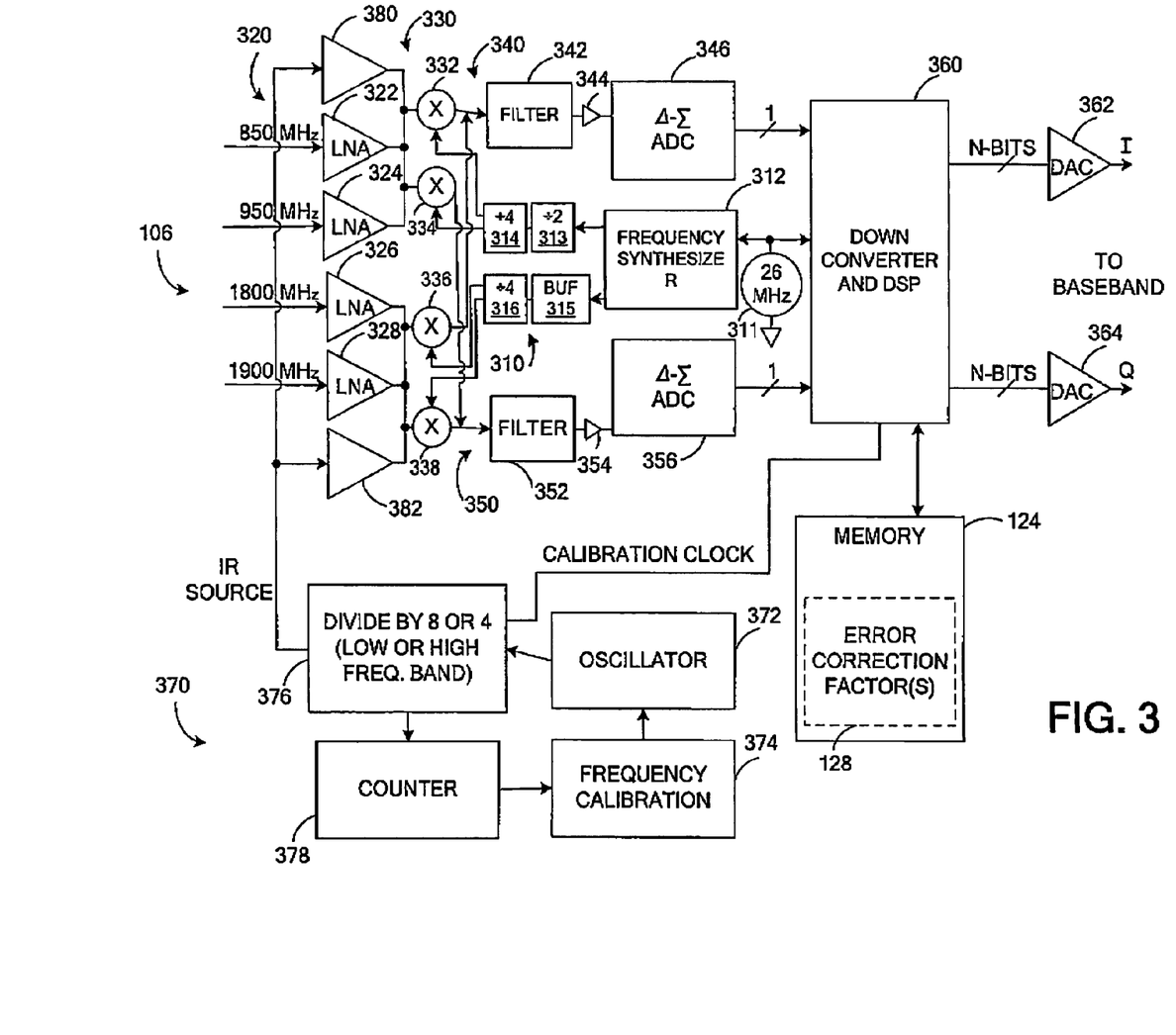
FIG. 3 is a more detailed block diagram of the communication system of FIG. 1 showing further details of the receiver circuit including calibration circuitry.

FIG. 3 is a more detailed block diagram of receiver 106 of FIG. 1 useful in understanding how it performs image rejection calibration and stores error correction factors obtained thereby in quasi non-volatile memory 124. Receiver 106 is adapted for use in a multi-standard cellular telephone system and has input terminals adapted to be connected to antenna switch 104 for receiving signals in any one of four bands, including two low bands at 850 megahertz (MHz) and 950 MHz, and two high bands at 1800 MHz and 1900 MHz corresponding to the bands used by the Global System for Mobile (GSM), Extended GSM (E-GSM), Digital Communication System (DCS), and Personal Communication Service (PCS) systems.

Receiver 106 includes generally quasi non-volatile memory 124, a local oscillator portion 310, a set of low noise amplifiers 320, a set of mixers 330, an in-phase processing path 340, a quadrature processing path 350, a down converter and DSP block 360, a digital-to-analog converter (DAC) 362, a DAC 364, and calibration circuitry 370. Local oscillator portion 310 includes an oscillator 311, a frequency synthesizer 312, dividers 313 and 314, a buffer 315, and a divider 316. Oscillator 311 provides a square wave clock output signal at about 26 MHz. Frequency synthesizer 312 has an input terminal connected to the output terminal of oscillator 311, and first and second output terminals for providing respective first and second clock signals. Divider 313 has an input terminal connected to the output terminal of synthesizer 312, and an output terminal. Divider 314 has an input terminal connected to the output terminal of divider 312, a first output terminal for providing a low-band in-phase LO signal, and a second output terminal for providing a low-band quadrature LO signal. Buffer 315 has an input terminal connected to second output terminal of synthesizer 312, and an output terminal. Divider 316 has an input terminal connected to the output terminal of buffer 315, a first output terminal for providing a high-band in-phase LO signal, and a second output terminal for providing a high-band quadrature LO signal.

Set of low noise amplifiers 320 includes LNAs 322, 324, 326, and 328. LNA 322 has an input terminal for receiving the 850 MHz RF signal, and an output terminal. LNA 324 has an input terminal for receiving the 950 MHz RF signal, and an output terminal. LNA 326 has an input terminal for receiving the 1800 MHz RF signal, and an output terminal. LNA 328 has an input terminal for receiving the 1900 MHz RF signal, and an output terminal.

Set of mixers 330 includes mixers 332, 334, 336, and 338. Mixer 332 has a first input terminal connected to the output terminals of LNAs 322 and 324, a second input terminal connected to the low-band in-phase output terminal of divider 314, and an output terminal. Mixer 334 has a first input terminal connected to the output terminals of LNAs 322 and 324, a second input terminal connected to the low-band quadrature output terminal of divider 314, and an output terminal. Mixer 336 has a first input terminal connected to the output terminals of LNAs 326 and 328, a second input terminal connected to the high-band in-phase output terminal of divider 316, and an output terminal. Mixer 338 has a first input terminal connected to the output terminals of LNAs 326 and 328, a second input terminal connected to the high-band quadrature output terminal of divider 316, and an output terminal.

In-phase processing path 340 includes a filter 342, a buffer 344, and a sigma-delta ($\Sigma\Delta$) ADC 346. Filter 342 has an input terminal connected to the output terminals of mixers 332 and 336, and an output terminal. Buffer 344, which may be in the form of a programmable gain amplifier, has an input terminal connected to the output terminal of filter 342, and an output terminal. $\Sigma\Delta$ ADC 346 has an input terminal connected to the output terminal of buffer 344, and an output terminal for providing a one-bit in-phase digital output signal.

Quadrature processing path 350 includes a filter 352, a buffer 354, and a $\Sigma\Delta$ ADC 356. Filter 352 has an input terminal connected to the output terminals of mixers 334 and 338, and an output terminal. Buffer 354, which may be in the form of a programmable gain amplifier, has an input terminal connected to the output terminal of filter 352, and an output terminal. $\Sigma\Delta$ ADC 356 has an input terminal connected to the output terminal of buffer 354, and an output terminal for providing a one-bit quadrature digital output signal.

Down converter and DSP 360 has a first input terminal connected to the output terminal of $\Sigma\Delta$ ADC 346, a second input terminal connected to the output terminal of $\Sigma\Delta$ ADC 356, an operating clock input terminal connected to the output terminal of oscillator 311, a calibration clock input terminal, a bidirectional connection to memory array 220, a first output terminal for providing an N-bit in-phase digital output signal, and a second output terminal for providing an N-bit quadrature digital output signal. DAC 362 has an input terminal connected to the first output terminal of down converter and DSP 360, and an output terminal for providing an analog in-phase IF signal labeled "I" to baseband circuitry 118. DAC 364 has an input terminal connected to the second output terminal of down converter and DSP 360, and an output terminal for providing an analog quadrature IF signal labeled "Q" to baseband circuitry 118.

Calibration circuitry 370 includes an oscillator 372, a frequency calibration block 374, a divider 376, a counter 378, and amplifiers 380 and 382. Oscillator 372 has an input terminal for receiving a frequency calibration signal, and an output terminal for providing a clock signal. Frequency calibration block 374 has an input terminal, and an output terminal connected to the input terminal of oscillator 372. Divider 376 has an input terminal connected to the output terminal of oscillator 372, a first output terminal connected to down converter and DSP block 360 for providing the CALIBRATION CLOCK thereto, a second output terminal for providing a tone used for image rejection calibration labeled "IR SOURCE", and a third output terminal for providing a divided clock signal. Counter 378 has an input terminal connected to the third output terminal of divider 376, and an output terminal connected to the input terminal of frequency calibration block 374. Amplifier 380 has an input terminal connected to the second output terminal of divider 376, and an output terminal connected to the input terminals of mixers 332 and 334. Amplifier 382 has an input terminal connected to the second output terminal of divider 376, and an output terminal connected to the input terminals of mixers 336 and 338.

In basic operation, receiver 106 receives and mixes any one of four RF input signals, clustered in a low band at either 850 MHZ or 950 MHz, or a high band at 1800 MHZ or 1900 MHz. LO portion 310 generates in-phase and quadrature LO signals for both the low band and high band. Frequency synthesizer 312 generates a high frequency clock signal at a frequency up to about 8 GHz. To generate the low-band LO signals, dividers 313 and 314 divide the high frequency clock signal by eight to generate in-phase and quadrature LO signals applied to the second input terminals of mixers 332 and 334, respectively, appropriate for the 850 MHz and 950 MHz bands. To generate the high-band LO signals, divider 316 divides the high frequency clock signal by four to generate in-phase and quadrature LO signals applied to the second input terminals of mixers 336 and 338, respectively, appropriate for the 1800 MHz or 1900 MHz bands.

The RF signals so mixed are then separated and processed in either in-phase path 340 or quadrature path 350. Thus the input terminal of filter 342 is connected to the output terminals of both mixers 332 and 336. Likewise the input terminal of filter 352 is connected to the output terminals of both mixers 334 and 338. The RF signals so mixed are then processed in separate paths. Then each of $\Sigma\Delta$ ADCs 346 and 356 convert the analog filtered signals into one-bit digital signals whose pulse densities are proportional to the levels of the respective input signals.

Down converter and DSP 360 includes two types of circuitry. The first type takes the one-bit pulse streams provided from the output terminals of $\Sigma\Delta$ ADCs 346 and 356 and converts them into multi-bit, i.e. N-bit, data words at a lower data rate. The second type performs further filtering in the digital domain. The N-bit digitally filtered signals are then converted back into the I and Q analog signals by DACs 362 and 364 for output to baseband circuitry 118.

Image rejection calibration will next be described. In general, frequency calibration unit 374 triggers a gross mismatch frequency calibration on startup. In general, frequency calibration unit 374 initializes oscillator 372 to produce through divider 376 a clock signal approximately centered within the high and low frequency bands supported by the device. In the multi-standard cellular telephone receiver example shown in FIG. 3, the high band is in the 1700 to 2000 Hz range, whereas the low band is in the 750-950 Hz range. As described above, the desired RF frequency will be approximately at a frequency of 1800 or 1900 MHz in the high band or 850 or 950 MHz in the low band, depending on the selected mode, which corresponds to specific geographic areas in which the device is operating.

Frequency calibration unit 374 causes oscillator 372 to output a clock signal at about the midpoint of each frequency band. Thus, since the low frequency band includes two inputs having nominal operating frequencies of 850 and 950 MHz, frequency calibration unit 374 generates a calibration tone at approximately 900 Hz. Also since the high frequency band includes two inputs having nominal operating frequencies of 1800 and 1900 MHz, frequency calibration unit 374 generates a calibration tone at approximately 1850 MHz. Divider 376 divides the clock signal provided at the output of oscillator 372 by either 8 or 4, depending on the selected band. Counter 378 counts the number of cycles and provides feedback to the frequency calibration unit 302, until the desired output is achieved.

The resulting calibration tone is then fed through amplifiers 380 and 382, mixed with a signal from frequency synthesizer 312, and then processed in the I and Q paths to generate a corresponding input to down converter and DSP 360.

Down converter and DSP 360 uses the calibration tone to calculate a complex error correction factor for each frequency band (one for the high band and one for the low band), and stores the error correction factors in area 128 of quasi non-volatile memory 124.

During the gross mismatch calibration operation, the clock signal produced by divider 376 is provided to down converter and DSP 360 so that the clocks are synchronized for calibration. By contrast, during normal operation, down converter and DSP 360 and frequency synthesizer 312 use the same 26 MHz clock 316.

Figure 4:
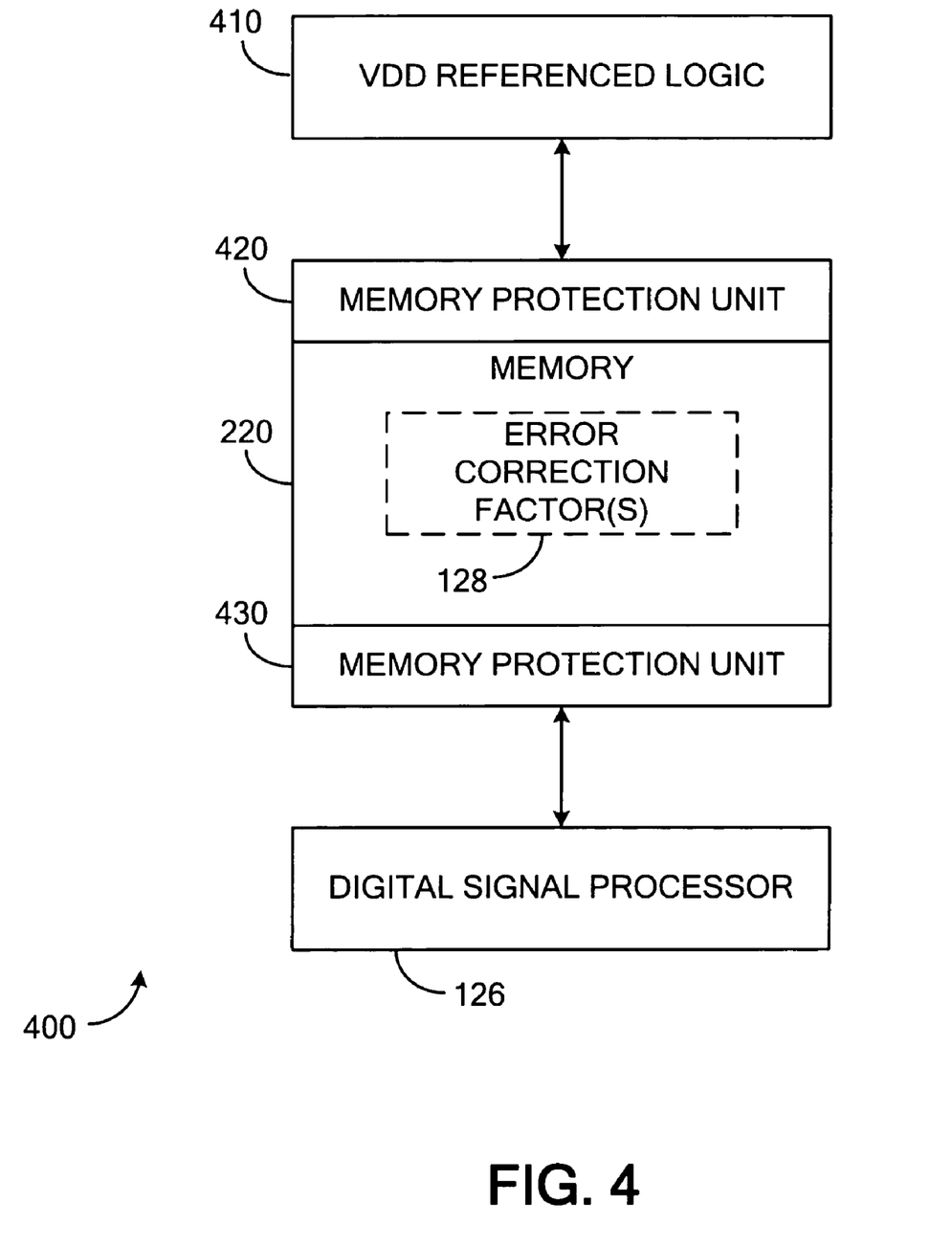
FIG. 4 is an expanded block diagram of a portion of the receiver circuit of FIG. 3 including the DSP and memory.

FIG. 4 is an expanded block diagram of a portion 400 of receiver circuit 100 of FIG. 1 including DSP 126 and memory array 220. As described above, memory array 220 has an area 128 for storing calibration results in the form of error correction factors. In portion 400, however, it can be seen that memory array 220 is dual-ported, allowing accesses from either DSP 126 or other logic labeled "VDD REFERENCED LOGIC" 410. Interposed between memory array 220 and each access source is a corresponding memory protection unit to protect against spurious write accesses while power has been removed from a corresponding access source. Thus, a memory protection unit 420 protects against spurious write accesses while power has been removed from VDD REFERENCED LOGIC 410. Likewise a memory protection unit 430 protects against spurious write accesses while power has been removed from DSP 126.

The actual calibration process may include both the gross mismatch calibration described above and additional tracking that takes place during normal operation using the actual received signal. Further details of such a calibration process and correction filter that may be used are disclosed in U.S. Pat. App. Publication No. 2005/0070236A1. However it should be apparent that this is just one example of a suitable calibration process and that the quasi non-volatile memory may be used with other types of calibrations.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention

What is claimed is:

1. A method comprising:
    calibrating calibration factors for a receiver circuit during an initialization period;
    storing the calibration factors in a quasi non-volatile memory associated with the receiver circuit;
    powering the quasi non-volatile memory from:
        a first source during a first receiver mode, wherein a plurality of independently powered components of the receiver circuit other than the quasi non-volatile memory are powered on; and
        a second source during a second receiver mode, wherein at least one of the plurality of independently powered components of the receiver is powered off, and at least another one of the plurality of independently powered components of the receiver circuit other than the quasi non-volatile memory is powered on; and
    providing a periodic wake up signal using the at least another one of the plurality of independently powered components of the receiver circuit other than the quasi non-volatile memory.

2. The method of claim 1 further comprising:
    locking the quasi non-volatile memory to prevent write operations at least during the second receiver mode.

3. The method of claim 2 wherein locking the quasi non-volatile memory further comprises:
    preventing write operations during a period while power for the quasi non-volatile memory is switching between the second source and the first source.

4. The method of claim 1 further comprising:
    periodically powering the receiver circuit frrm the first source to test for signals received from a base station.

5. The method of claim 1 further comprising:
    turning off power to the receiver circuit during the second receiver mode.

6. The method of claim 1 wherein the first source comprises a transceiver supply
    voltage and wherein the second source comprises a low supply voltage at a lower electrical potential than the transceiver supply voltage.

7. The method of claim 1 wherein the calibrating comprises:
    calibrating image rejection factors for the receiver circuit during the initialization period.

8. A receiver circuit comprising:
    a first supply voltage with a first electrical potential;
    a second supply voltage with a second electrical potential;
    a quasi non-volatile memory adapted to store calibration results for the receiver circuit, the quasi non-volatile memory coupled to the first supply voltage and to the second supply voltage and adapted to derive power from a selected one of the first supply voltage and the second supply voltage responsive to a change of state of the receiver circuit between a first state and a second state, wherein:
        in the first state of the receiver circuit, a plurality of independently powered components of the receiver circuit other than the quasi non-volatile memory are powered on; and
        in the second state of the receiver, at least one of the plurality of independently powered components of the receiver circuit other than the quasi non-volatile memory is powered off, and at least another one of the plurality of independently powered components of the receiver is powered on, and the at least another one of the plurality of independently powered components of the receiver circuit other than the quasi non-volatile memory provides a periodic wake up signal.

9. The receiver circuit of claim 8 wherein the first electrical potential is greater than the second electrical potential.

10. The receiver circuit of claim 8 wherein the first state of the receiver circuit comprises:

an active receive state during which the first supply voltage remains active.

11. The receiver circuit of claim 10 wherein the quasi non-volatile memory derives power from the first supply voltage during the active receive state.

12. The receiver circuit of claim 8 wherein the second state of the receiver circuit comprises:

an inactive state during which the first supply voltage is shut off.

13. The receiver circuit of claim 12 wherein the quasi non-volatile memory derives power from the second supply voltage during the inactive state.

14. The receiver circuit of claim 12 further comprising:

a memory protection unit adapted to prevent writing to the quasi non-volatile memory while the receiver circuit is in the inactive state or in between states.

15. The receiver circuit of claim 12 further comprising:

a power switch for switching power to the quasi non-volatile memory from either the first supply voltage or the second supply voltage responsive to the change of state.

\* \* \* \* \*

UNITED STATES PATENT AND TRADEMARK OFFICE
CERTIFICATE OF CORRECTION

| | | |
|---|---|---|
| PATENT NO. | : 7,979,048 B2 | Page 1 of 1 |
| APPLICATION NO. | : 11/227796 | |
| DATED | : July 12, 2011 | |
| INVENTOR(S) | : Donald A. Kerth et al. | |

It is certified that error appears in the above-identified patent and that said Letters Patent is hereby corrected as shown below:

In column 10, line 31, replace "frrm" with "from".

Signed and Sealed this
Second Day of October, 2012

David J. Kappos
*Director of the United States Patent and Trademark Office*